A. C. BISHOP.
APPARATUS FOR MANUFACTURING ICE.
APPLICATION FILED JULY 29, 1907.

920,248.

Patented May 4, 1909.
2 SHEETS—SHEET 1.

WITNESSES:
E. M. Fisher,

INVENTOR.
Albert C. Bishop,
BY
Fisher & Moser
ATTORNEYS.

A. C. BISHOP.
APPARATUS FOR MANUFACTURING ICE.
APPLICATION FILED JULY 29, 1907.
920,248.
Patented May 4, 1909.
2 SHEETS—SHEET 2.
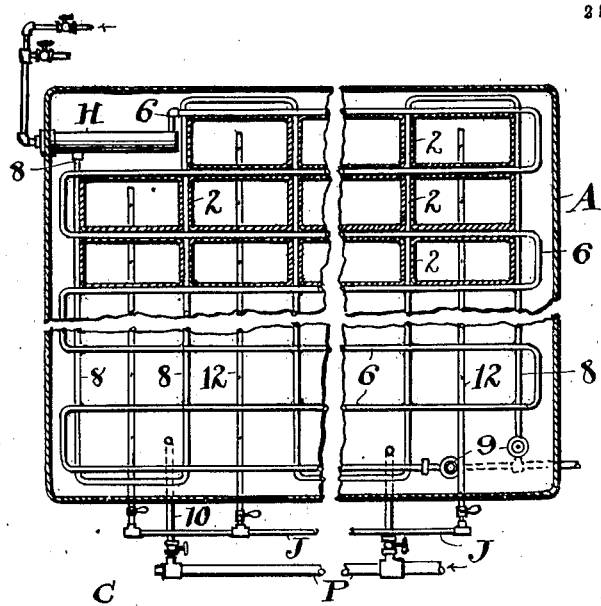
Fig. 3.
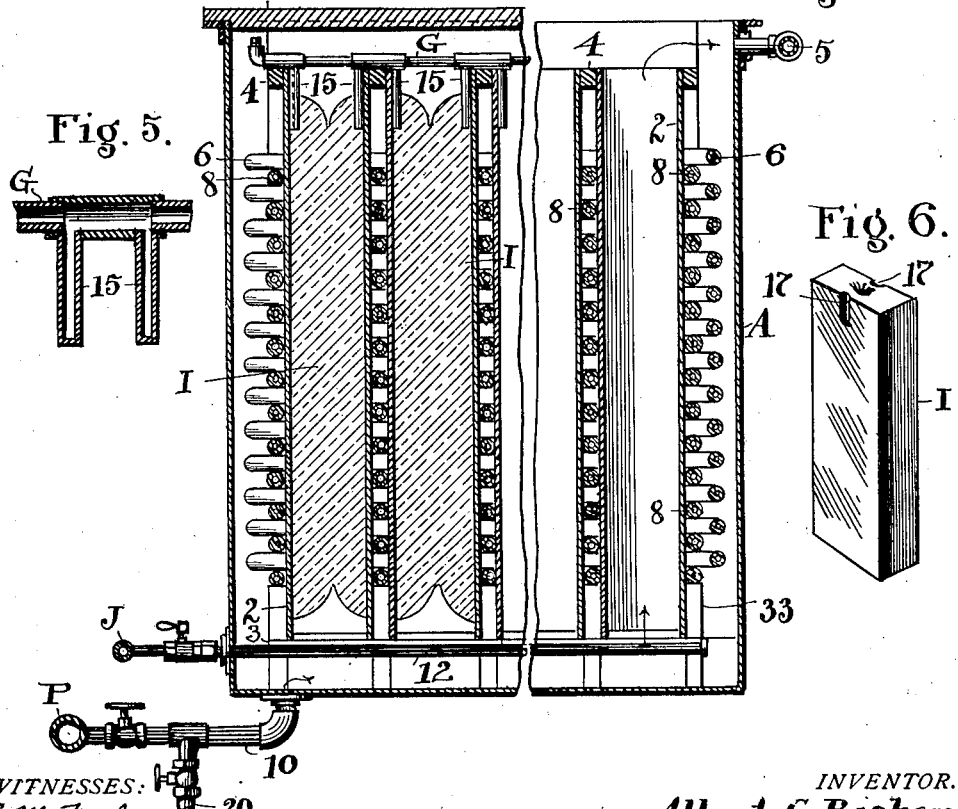
Fig. 4.
Fig. 5.
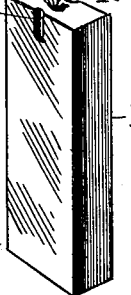
Fig. 6.
WITNESSES:
E. M. Fisher
J. C. Musson.
INVENTOR.
Albert C. Bishop
BY
Fisher & Moser
ATTORNEYS.

UNITED STATES PATENT OFFICE.

ALBERT C. BISHOP, OF DETROIT, MICHIGAN.

APPARATUS FOR MANUFACTURING ICE.

No. 920,248.　　　Specification of Letters Patent.　　　Patented May 4, 1909.

Application filed July 29, 1907. Serial No. 386,100.

*To all whom it may concern:*

Be it known that I, ALBERT C. BISHOP, a citizen of the United States, residing at Detroit, in the county of Wayne and State of Michigan, have invented certain new and useful Improvements in Apparatus for Manufacturing Ice, and do declare that the following is a full, clear, and exact description of the invention, which will enable others skilled in the art to which it appertains to make and use the same.

My invention relates to means for artificially producing blocks or cakes of ice of suitable commercial size, all substantially as shown and described and particularly pointed out in the claims.

Figure 1:
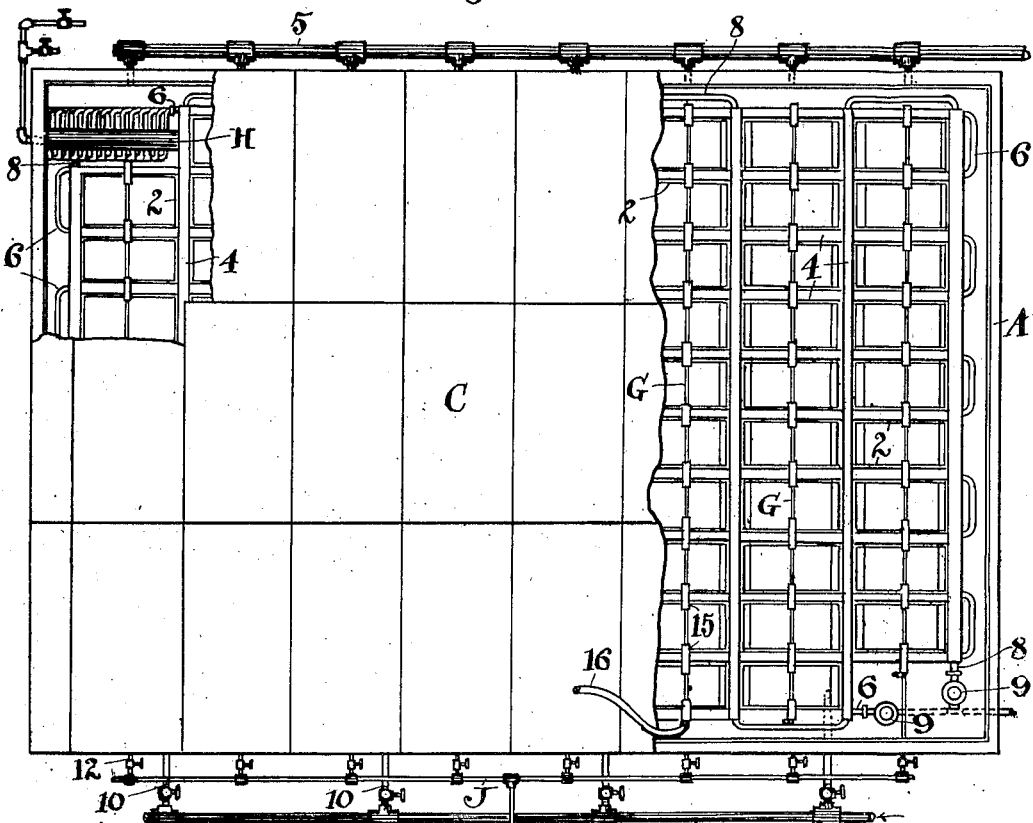
Figure 2:
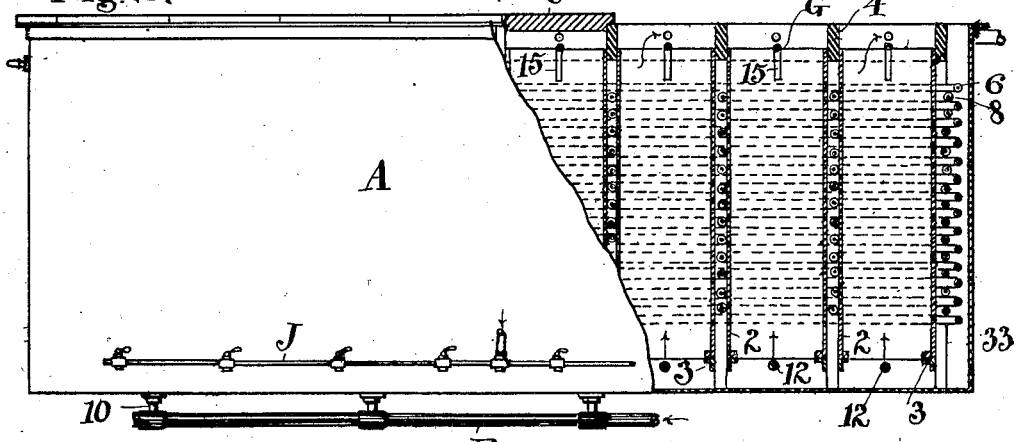

In the accompanying drawings, Figure 1 is a plan view of one of my new and improved water tanks in which the ice is frozen, and Fig. 2 is an elevation partially in section of said tank. Fig. 3 is a horizontal sectional plan of one of the tanks, the same being broken out on cross lines both ways, and Fig. 4 is a sectional elevation of the tank broken out and at right angles to Fig 2 and showing same as when in freezing condition. Fig. 5 shows a section of a removable steam pipe, as hereinafter described, and Fig. 6 is a perspective view of a block of ice made in my apparatus.

The present apparatus is differentiated from other and well known means for manufacturing blocks of ice in that all such methods as are familiar to me employ distilled water, which is frozen in molds and subjected to freezing coils along their broad sides or between parallel rows of molds running in one way only. When the ice is frozen the mold is bodily lifted out of the freezing solution and the ice removed, as before. All these means involve more or less expensive distilling apparatus and the handling of a great many molds both for removing the ice and for refilling, all of which is hand work and hence expensive, as well as other expensive requirements, which I avoid. Now, I have developed means for making perfectly clear and clean ice from undistilled water, or from water as it is obtained from a suitable source of supply, as a running stream, lake, well or reservoir, and what I may term natural water in contradistinction to water that has been subjected to preparatory processes. Furthermore, as a part of my manufacture, I keep the water in circulation or movement while the freezing progresses and at the same time subject it to aeration by forcing air into the same under pressure and which, with the movement of the water itself from the lower to the higher levels, where it overflows, carries away organic and other impurities and promotes clarification of the water to be frozen, all as fully set forth herein. In this way I also dispense entirely with the removable molds or cans heretofore employed in manufacturing block ice, insofar as I am acquainted with the art.

To these ends and in carrying out my invention, the first unit in my apparatus is the tank or box A, and which has a capacity say of one hundred and ten sub-divisions or chambers, say 11x12 inches across and an elevation corresponding substantially to the height of the block of ice to be made, plus certain spaces above and below the block for purposes to be described. As many of these tanks may be employed in a plant as the demands of trade may require, it being borne in mind that about 36 hours are required for freezing a given tank. Ordinarily, a series of four tanks can be worked together economically, and each tank say of 22 tons capacity. Said tanks are equipped, first, with permanently fixed freezing chambers having walls 2 by which they are formed, and said chambers are wide open at both ends to the interior of the tank. In this instance they are supported beneath on suitable angle irons or bars 3, fixed a few inches above the bottom of the tank, so as to leave a free space beneath the said chambers for the circulation of water, and suitable cross bars or frame pieces 4 above serve to stay said chamber walls 2 in fixed relations. These bars come beneath the top edge of the tank as seen in Fig. 4, which leaves a clear space also above said chambers for the overflow of cast off water through pipe 5. The eliminated impurities are carried off in this way. The said chamber walls 2 constitute in each case a tube, preferably rectangular in cross section and with smooth interior, and said walls are separated or spaced apart sufficiently about the four sides of each chamber to introduce the freezing coils or pipes 6 and 8 respectively between them. These are arranged relatively as shown, so that the freezing agent will reach each chamber all around its full working depth, and to this end I provide tank A with a suitable header H, from which circulation of the ammonia or other gas is forced and travels through said circulating pipes 6 and 8, having pipe 6 leading from said header and traversing the spaces between the broad sides of said freezing chambers from top to bottom relatively as shown in Figs. 3 and 4, and pipes 8 traversing the narrow sides of said chambers as also seen in Figs. 3 and 4, and likewise in Fig. 2. A suitable suction header or headers 9 shown in cross section Figs. 1 and 3 usually connect the outlet terminals of said pipes 6 and 8, Fig. 1, and said terminals H and 9 are preferably located in diagonal corners of the tank. The arrangements of pipes and headers as shown provides for uniform distribution of the freezing agent throughout the tank and consequent uniform freezing of the water within all the chambers. The said tank A is designed to be kept filled to overflow through outlet 5 during the freezing process, and to this end I provide a water supply pipe P, which has one or more branch pipes 10 leading therefrom into said tank, and several such branch pipes are preferably employed so as to promote uniformity of temperature and conditions in the tank.

The volume of water supplied over and above what is necessary to fill the tank, is measurably dependent on its condition as to purity, and which circulation or flow of the water will help to promote, and such volume or flow is easily regulated by the attendant by cock or otherwise in the supply pipe. Neither do I find that such circulation of water materially hinders freezing, because the freezing action naturally begins on the walls of the chambers next to the pipes and continues inward until a solid block is formed substantially to the full depth of said chambers, and the moving or rising water comes between the four walls of the forming block and continues to move until the interior also is frozen solid. This movement and the agitation and purification of the water meantime is materially promoted by the introduction of atmosphere from beneath through air supply pipe J, which has a plurality of feed pipes 12 that enter the bottom of the tank and distribute air more or less generally and uniformly in and through the body of water in the tank and centrally upward through said chambers. It is of course understood by this time that the tank is bodily filled with the water, and that chamber walls 2 merely subdivide this body of water into ice-block size but are open full size top and bottom, and the ice has the depth of the freezing pipes about said walls more or less as seen in Fig. 4. This leaves a portion of unfrozen water above and below the blocks of ice when finished. Of course, air is supplied to the tank under pressure and likewise in greater or less quantity as conditions of the water may demand. Ultimately, however, by this dual process of flowing the water through the tank while freezing and agitating the water at the same time by discharging air thereinto, I am enabled to produce blocks of ice of exceptional clearness and purity from water which would seem from appearances to be wholly unfit for this purpose and would be unfit but for its successful treatment in this way.

To release the ice from chamber walls 2, I switch off the refrigerated brine or other solution from pipes 6 and 8 and flow sufficient hot gas or fluid of some kind through said pipes to detach the block of ice from said walls. Then in order to be able to reach said block from above and lift it out I flow steam or the like into pipe G, which has tubular nipples 15 open thereto and extending into the tops of chambers 2, and which form side pockets or recess in the blocks of ice. This done said nipples are released and removed with pipe G. Rubber or other flexible and detachable steam connections 16 are made with said pipe. The ice blocks can then be grasped by tongs in the channels 17 Fig 6 and bodily lifted out.

Suitable regulating cocks or valves are employed in all the various lines of pipe for air, water, gas and steam, and need not be further particularized. Fig. 4 shows a drain pipe 20 for the tank, which tank can be emptied and further cleansed as often as may be needed. Sectional covers C are employed large enough in this instance to each cover several ice chambers. Having all the details of construction arranged substantially as shown the water is turned on and the tank filled. Then the controlling cock for the water is set according to the flow deemed to be necessary for cleansing purposes, the refrigerating gases or fluids are turned on and also the air, and with the tank covered the freezing begins and continues until solid blocks of ice are produced in the various chambers. Under normal or usual conditions these blocks should form equally and be frozen solid at about the same time, though local conditions here or there may make some differences. However, an entire tank is handled as a unit, and none of the blocks are removed until all are ready.

The freezing or expansion pipes 6 and 8 are supported from the bottom of the tank on posts 33, or their equivalent, between walls 2 of the refrigerating chambers or spaces, and tank A is preferably of sheet steel of suitable weight. Insulation may be provided about the exterior of the tank if preferred. The covers C run in transverse or longitudinal series, and each separate cover is separately removable.

In the foregoing construction and arrangement of parts, it will be seen that the lowest coil or pipe between the numerous ice forming chambers is sufficiently far above the air inlet or supply pipe to avoid freezing said pipe and possibly bursting it, when, for any reason, there is no flow of air and the pipe becomes filled with dead water.

The freezing line of the ice is plainly indicated in Fig. 4, and it will be observed that freezing occurs to a limited depth below the lower coil and cannot extend farther than that. Then again, the inflow of fresh water into the bottom of the tank contributes to prevent possible freezing of the air pipe. It will also be noticed as a feature of this invention that a given arrangement of pipes about an ice forming chamber serves to freeze adjacent chambers, and that the operation is materially different in this respect from the disposition of refrigerating pipes in an ordinary salt or other solution where the solution is reached by the pipes, and freezing of the ice occurs through the solution and not through or from the pipes as such. In the present construction of my apparatus, the tank A is filled with water and the refrigerating pipes are immersed in the water as such.

The ice is formed in the freezing chambers between the end thereof as clearly indicated at the left in Fig. 5 and within the portion of said chamber surrounded by the freezing coils or pipes. Said chambers rest down upon the angle-bars or irons 3, and when the blocks of ice frozen therein are liberated, they drop down upon these angle-bars or immediately over them and are then at liberty to be drawn out from the top of the chamber.

What I claim is:—

1. An ice making apparatus comprising a tank adapted to be filled with fresh water and provided with an inlet for water at its bottom and an overflow at its top, whereby the water is caused to rise in the tank while freezing occurs, in combination with a series of vertically disposed freezing chambers adapted to be bodily immersed in the water in the tank and open at both ends, and refrigerating coils arranged one upon the other at all the sides of said chambers between their ends.

2. In ice manufacture, a tank adapted to be filled exclusively with moving fresh water, in combination with ice forming chambers open at both ends and adapted to be immersed in the water in said tank, said chambers being permanently built into the tank at both ends, and pipes carrying the refrigerating agent arranged one immediately over the other about the four sides of said chambers between their ends to freeze the water therein.

3. In ice manufacture, a tank adapted to be filled exclusively with fresh water and having an inlet to maintain the flow of water and an overflow outlet, and a series of vertically disposed ice forming chambers in said tank immersed bodily in the fresh water, in combination with two series of pipes carrying the freezing agent crossing each other at right angles about the sides of said chambers and substantially in contact therewith, said pipes arranged to cover the sides of said chambers uniformly between their ends and supply and suction headers respectively for said pipes.

4. An ice making apparatus comprising a tank adapted to be filled exclusively with fresh water and having inlet and outlet openings to maintain a flow of fresh water through the same, a series of rectangular refrigerating chambers permanently built into said tank above the bottom thereof and open across their bottom and top to the water in said tank and exposed thereto about their sides, and refrigerating pipes in series about the four sides of said chambers substantially from end to end, said tank having spacing pieces at its top between said chambers and above said pipes.

5. An ice freezing apparatus comprising a tank adapted to be filled exclusively with fresh flowing water and refrigerating chambers built fixedly into the same at their ends and open to the water in the tank, freezing pipes extending entirely around said chambers one immediately above the other next to the walls thereof, means to maintain a flow of water up through said tank and said chambers and about said pipes during freezing, and means to maintain a discharge of air into said chambers from beneath and thereby agitate the water as it rises to higher levels.

6. In an ice making apparatus, a tank and refrigerating chambers therein, in combination with a pipe having depending nipples entering the tops of said chambers and adapted to form recesses in the block of ice to enable it to be removed.

7. A refrigerating tank and a series of vertically disposed freezing chambers therein, in combination with means to release the ice in said chambers comprising a pipe adapted to carry a heating agent and provided with nipples extending into the tops of said chambers next to the walls thereof.

8. A refrigerating tank for an ice forming apparatus and a series of ice forming chambers bodily submerged in the water in said tank and open at both ends, a frame in which said chambers are fastened at their ends, and freezing pipes arranged immediately about said chambers between the upper and the lower portions of said frame.

9. An apparatus for making ice comprising a tank and a series of ice forming chambers irremovably fixed in a vertical position therein above the bottom of the tank, said chambers open across both ends to the interior of the tank, and ledges in the lower ends of said chambers adapted to support the blocks of ice formed therein.

In testimony whereof I sign this specification in the presence of two witnesses.

ALBERT C. BISHOP.

Witnesses:
R. B. MOSER,
F. C. MUSSUN.